US010116191B2

(12) United States Patent
Zhang et al.

(10) Patent No.: US 10,116,191 B2
(45) Date of Patent: Oct. 30, 2018

(54) ELECTRIC MOTOR HAVING A PROTECTION STRUCTURE FOR ELECTRONIC COMPONENTS

(71) Applicant: Johnson Electric S.A., Murten (CH)

(72) Inventors: Hong Wei Zhang, Shenzhen (CN); Zhi Dan Liu, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 193 days.

(21) Appl. No.: 15/007,635

(22) Filed: Jan. 27, 2016

(65) Prior Publication Data

US 2016/0218601 A1    Jul. 28, 2016

(30) Foreign Application Priority Data

Jan. 28, 2015    (CN) .......................... 2015 1 0044975

(51) Int. Cl.
| | | |
|---|---|---|
| H02K 11/40 | (2016.01) | |
| H02K 11/215 | (2016.01) | |
| H02K 23/40 | (2006.01) | |
| H02K 5/15 | (2006.01) | |
| H02K 5/14 | (2006.01) | |

(52) U.S. Cl.
CPC ........... *H02K 11/215* (2016.01); *H02K 5/145* (2013.01); *H02K 5/15* (2013.01); *H02K 11/40* (2016.01); *H02K 23/40* (2013.01); *H02K 2213/03* (2013.01)

(58) Field of Classification Search
CPC ........ H02K 5/145; H02K 5/15; H02K 11/215; H02K 11/40; H02K 2213/03; H02K 23/40

USPC .......................................... 310/51, 68 B, 71
See application file for complete search history.

(56) References Cited

U.S. PATENT DOCUMENTS

| | | | | |
|---|---|---|---|---|
| 5,914,547 A * | 6/1999 | Barahia | .................... | H02K 7/08 310/71 |
| 9,318,932 B2 * | 4/2016 | Purohit | .................... | H02K 9/06 |
| 2002/0050759 A1 * | 5/2002 | Shiraki | .................. | H02K 5/145 310/239 |
| 2002/0060105 A1 * | 5/2002 | Tominaga | ............ | B62D 5/0406 180/443 |
| 2006/0152096 A1 * | 7/2006 | Helmi | ...................... | H02K 5/15 310/90 |
| 2006/0220474 A1 * | 10/2006 | Yoshida | ................. | H02K 11/40 310/43 |
| 2010/0181853 A1 * | 7/2010 | Wong | ..................... | H02K 5/225 310/72 |
| 2011/0210631 A1 * | 9/2011 | Siegl | ....................... | F16C 27/00 310/90.5 |
| 2012/0025636 A1 * | 2/2012 | Roopnarine | ............ | H02K 1/02 310/46 |

(Continued)

*Primary Examiner* — Bernard Rojas
*Assistant Examiner* — Rashad Johnson
(74) *Attorney, Agent, or Firm* — Muncy, Geissler, Olds & Lowe, P.C.

(57) ABSTRACT

A motor has a stator, a rotor, an end cover assembly installed on an axial end of the stator and the rotor. The rotor includes a shaft. The end cap assembly includes an end cap, a cover, and a circuit board arranged between the cover and the stator. At least one electronic element is mounted on the circuit board. The shaft passes through a hole in the cover. The cover and the shaft are made of a conductive material. With such structure damage to the circuit board and the electronic element due to high-voltage static electricity is avoided.

9 Claims, 5 Drawing Sheets

(56) References Cited

U.S. PATENT DOCUMENTS

| | | | | |
|---|---|---|---|---|
| 2012/0112588 A1* | 5/2012 | Watanabe | ............... | H02K 1/276 |
| | | | | 310/90 |
| 2013/0307380 A1* | 11/2013 | Zeng | ................... | H02K 11/024 |
| | | | | 310/68 R |
| 2016/0099623 A1* | 4/2016 | Bohm | ...................... | H02K 3/28 |
| | | | | 310/43 |

* cited by examiner

ELECTRIC MOTOR HAVING A PROTECTION STRUCTURE FOR ELECTRONIC COMPONENTS

CROSS REFERENCE TO RELATED APPLICATIONS

This non-provisional patent application claims priority under 35 U.S.C. § 119(a) from Patent Application No. 201510044975.9 filed in The People's Republic of China on Jan. 28, 2015 the entire contents of which are hereby incorporated by reference.

FIELD OF THE INVENTION

This invention relates to electric motors and in particular, to an electric motor capable of withstanding high-voltage static electricity.

BACKGROUND OF THE INVENTION

A known motor is illustrated in FIG. 5, with an end cap removed to show a cover 106 and a circuit board 102 of an end cap assembly. The circuit board 102 is disposed inside the cover of the end cover assembly, and electronic elements 104 such as Hall sensors are electrically mounted on the circuit board. To save cost, the cover is usually made of a plastic material. When subjected to high-voltage static electricity, the plastic cover cannot dissipate the static electricity. The static electricity passes through the plastic cover to the circuit board where usually the static electricity is strong enough to damage the electronic elements mounted on the circuit board, including any Hall sensors.

SUMMARY OF THE INVENTION

Hence, there is a desire for an electric motor having greater immunity to high-Voltage static electricity.

Accordingly, in one aspect thereof, the present invention provides an electric motor comprising: a stator, a rotor rotatably disposed inside the stator and having a shaft, an end cap assembly fitted to an axial end of the stator and comprising; a cover having a hole, a circuit board disposed between the rotor and the cover, and at least one electronic element mounted on the circuit board, wherein the shaft extends through the hole in the cover, and the cover and the shaft are made of a conductive material.

Preferably, the at least one electronic element is a Hall sensor.

Preferably, motor according to claim 1 or 2, wherein the conductive material is a stainless steel material.

Preferably, an air gap is formed between the through hole and the shaft, and a width of the air gap is small enough for high-voltage static electricity to be conducted between the cover and the shaft, across the air gap.

Preferably, the width of the air gap is not larger than 0.25 mm.

Preferably, the motor is a permanent magnet brush direct current motor.

Preferably, the motor is a permanent magnet brushless direct current motor.

Preferably, the motor further comprises a bearing fixed on an end of the shaft remote from the end cap assembly, and the bearing is electrically connected to a housing of the motor.

Preferably, the motor further comprises a conductive connection member through which the cover is electrically connected to a housing of the motor.

Preferably, the conductive connection member is a wire.

The advantageous effect of the invention lies in that damage to the circuit board and electronic elements connected onto the circuit board sensitive to the high-voltage static electricity can be avoided for the motor, and thus the lifetime of the motor is prolonged.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
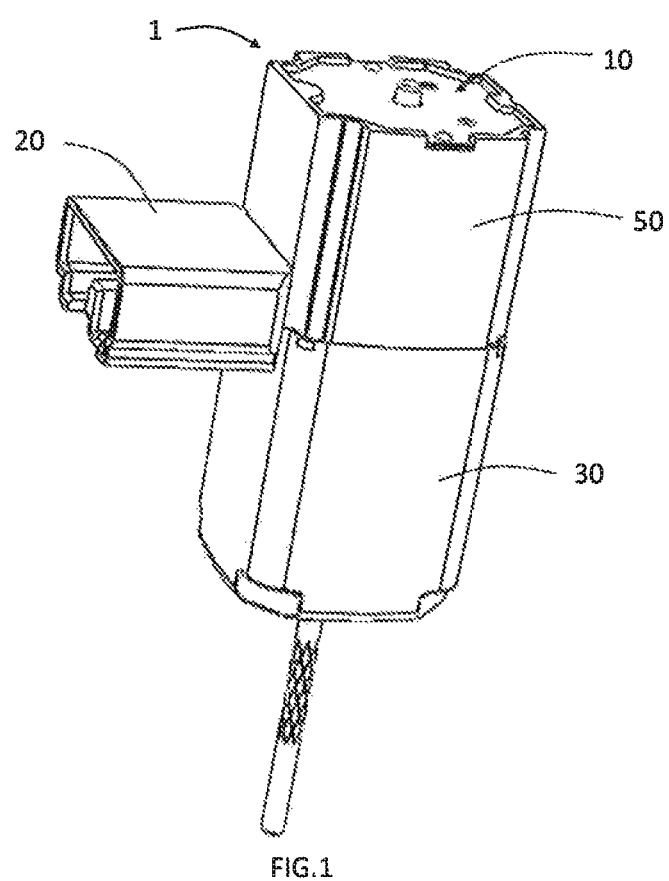
FIG. 1 illustrates a motor according to the preferred embodiment of the present invention.
Figure 2:
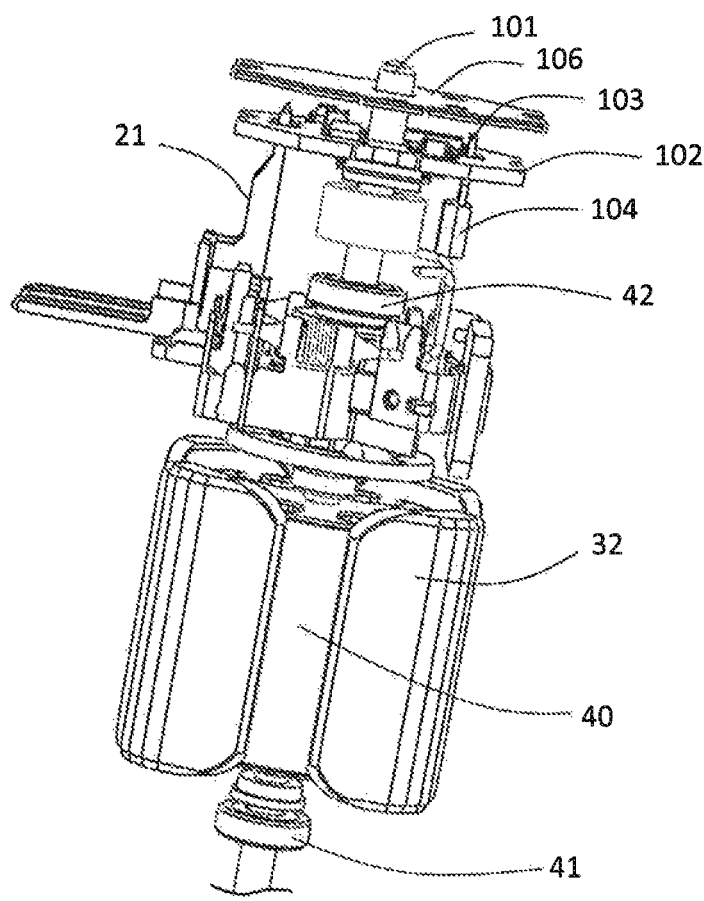
FIG. 2 is a partial view of the motor of FIG. 1, with a stator housing and end cap removed.
Figure 3:
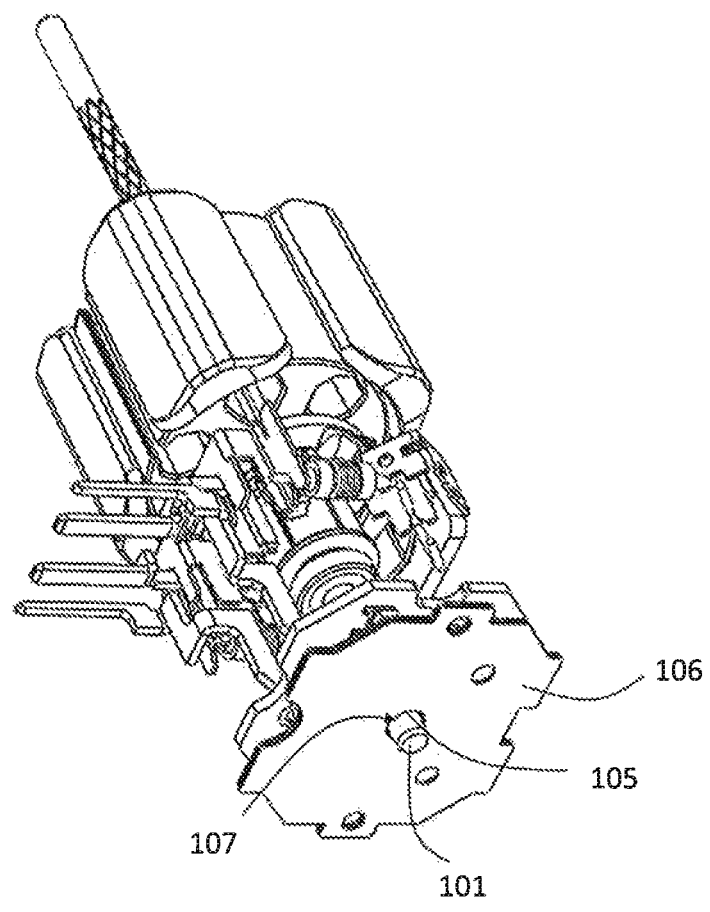
FIG. 3 illustrates the motor of FIG. 2, viewed from a different aspect.

FIGS. 1 to 3 illustrate a motor according to a preferred embodiment of the present invention. In the embodiment, a permanent magnet brush direct current motor is described as an example. The motor 1 includes a stator 30, a rotor 40 rotatably installed inside the stator 30, an end cap assembly 10 fixed to an axial end of the stator 30 and the rotor 40. The end cap assembly includes an end cap 50, a cover 106 and a circuit board 102 supported by the end cap and disposed between the cover 106 and the stator. The rotor 40 includes a shaft 101. The shaft is mounted in bearings 41, 42 fitted to the stator and the end cap respectively. The shaft extends through the end cap assembly, including the circuit board and the cover. The cover has a hole 105 through which the shaft extends. The cover and the shaft are made of a conductive material. The circuit board 102 is located between the cover 106 and the first bearing 42 fitted to the end cap 50. The stator 30 has a housing 100 (see FIG. 4) and a permanent magnetic field generated by one or more pieces of permanent magnet fixed to the stator housing. In this embodiment the housing has a squarish cross section with four corners and the magnetic field has four poles generated by four separate permanent magnets 32 disposed one in each corner of the housing. The housing 100 is cup shaped and the end cap is fitted to the open end of the housing. In this embodiment, no change is made to the other elements included in the stator 30 and the rotor 40, which are not elaborated here. In another embodiment, the motor 1 may be a permanent magnet brushless direct current motor or another type of motor.

The size of the cross section of the end cap 50 matches that of the cross section of the stator housing 100, so that the end cap 50 covers axial end of the stator 30. In the embodiment, the size of the cross section of the end cap 50 is equal to that of the cross section of the stator. The end cap 50 has a recessed portion covered by the cover to form a compartment in which the circuit board 102 is disposed, such that the cover also covers the circuit board.

The motor 1 further includes an electrical connector 20. A part of the electrical connector 20 is fixed inside the end cap 50, and the other part is exposed outside of the end cap 50 and configured to be connected to an external controller or power supply. In the embodiment, the electrical connector 20 includes two power terminals and two signal terminals. The two signal terminals 21 have a portion that is parallel to the shaft 101 and electrically connected to the circuit board 102 inside the end cap 50. The power terminals connect to brushes of the end cap to supply power to the rotor in the usual manner.

In the embodiment, the conductive material is a stainless steel material. Of course, the conductive material may be another material, for example, a metal material such as copper, aluminum and iron. Multiple electronic contacts 103 are formed on the circuit board 102 and at least one electronic element 104 is electrically connected onto the circuit board 102 via the contacts. In the embodiment, the at least one electronic element is a Hall sensor 104. The Hall sensor 104 is used to detect a rotational speed of the rotor. In another embodiment, the Hall sensor 104 may be used to detect a direction of rotation of the rotor.

With reference to FIG. 3, the through hole 105 is arranged at the center of the cover 106. An air gap 107 is formed between the through hole 105 and the shaft 101. The width of the air gap 107 is small enough, such that a resistance of the air gap 107 is small enough to cause or allow static electricity built up on the cover to discharge to the shaft. Therefore, when high-voltage static electricity is built up on the cover, such as when the motor is subjected to a high-voltage static electricity field, it is easy for the static electricity to pass through the air gap 107 to the shaft 101, thereby reducing the voltage of any static electricity built up on the cover. As the shaft is effectively connected to ground potential, for example through the bearing and stator, the static electricity is safely dissipated. In this embodiment, the width of the air gap 107 is not larger than 0.25 mm, which is much smaller than a distance between the circuit board and the cover. In other embodiments, various adjustments may be made to the width of the air gap depending on the size of the motor.

Figure 4:
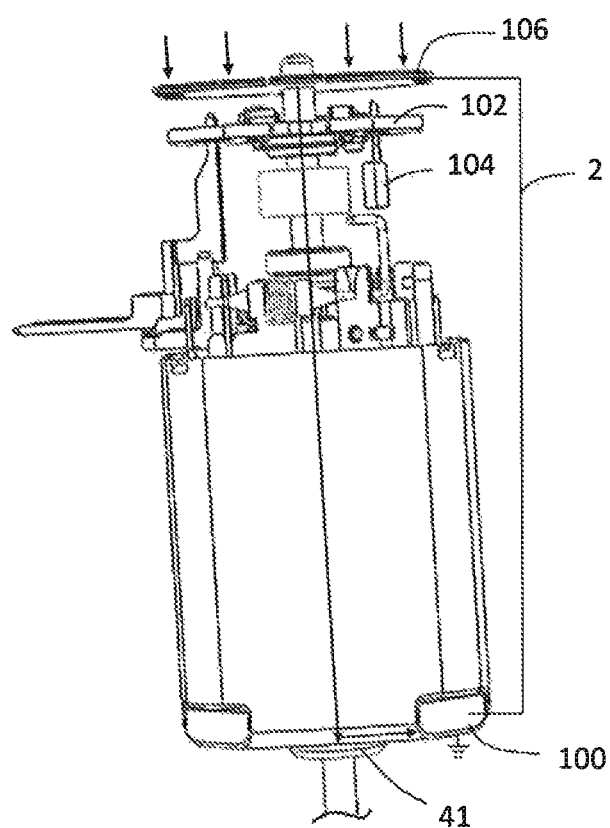
FIG. 4 is a front view of the motor of FIG. 1, with the end cap removed and with arrows indicating the flow direction of high-voltage static electricity.
Figure 5:
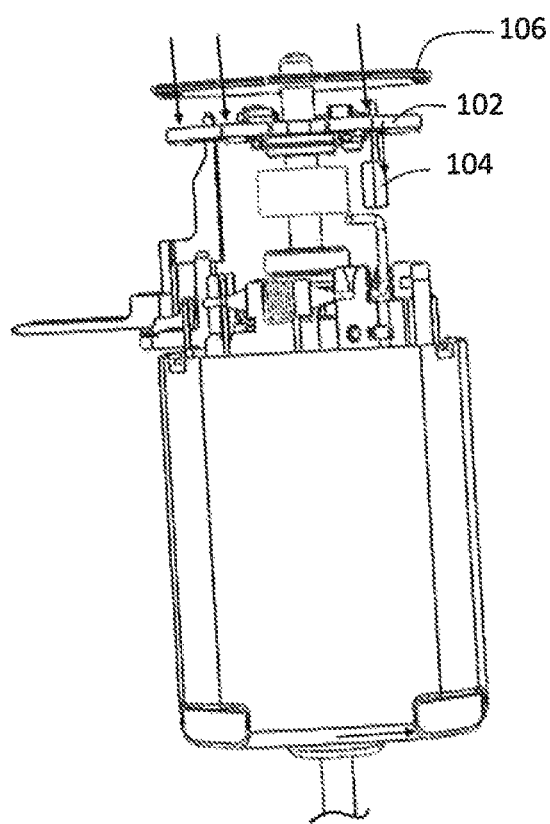
FIG. 5 is a view similar to FIG. 4, of a prior art motor.

With reference to FIG. 4, when a high-voltage static electricity is applied to the end cap assembly 10 of the motor 1, the high-voltage static electricity applied to the cover 106 is conducted from the cover 106 to the shaft 101 through the air gap 107 since the cover 106 and shaft 101 are made of a conductive material. Since the width of the air gap 107 between the shaft 101 and the cover 106 is small enough such that the resistance of the air gap is small enough to conduct high-voltage static electricity between the cover and the shaft. Therefore, when a high-voltage static electricity field is applied to the cover, it is easy for the high-voltage static electricity to pass through the air gap 107 to be dissipated by the shaft 101, thereby reducing the voltage of the high-voltage static electricity that is built up on the cover 106. During the process, since the cover 106 and the shaft 101 are made of a conductive material and the air gap 107 is small enough, the high-voltage static electricity does not pass through the cover 106 and reach the circuit board 102, thereby avoiding damage to the electronic element 104, such as a Hall sensor, on the circuit board.

In the first embodiment, the shaft 101 is grounded via the second bearing 41 and the stator housing 100. In a second embodiment, the cover is grounded directly to the stator housing 100 via a conductive connection member 2, instead of or in addition to the shaft connection, to dissipate static electricity. Preferably, in the second embodiment, the conductive connection member 2 is a wire.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric motor comprising: a stator, a rotor rotatably disposed inside the stator and having a shaft, an end cap assembly fitted to an axial end of the stator, the stator having at least one piece of permanent magnet, and the end cap assembly comprising: a cover having a hole, a circuit board disposed between the at least one piece of permanent magnet and the cover, and at least one electronic element mounted on the circuit board, wherein the shaft extends through the hole in the cover, and the cover and the shaft are made of a conductive material, and wherein an air gap is formed between the hole and the shaft, both sides of the air gap respectively extend to an inner peripheral surface of the hole in the cover and an outer peripheral surface of the shaft, and a width of the air gap is not larger than 0.25 mm, wherein the air gap is small enough for high voltage static electricity to be conducted between the cover and the air gap.

2. The motor of claim 1, wherein the at least one electronic element is a Hall sensor.

3. The motor of claim 1, wherein the conductive material is a stainless steel material.

4. The motor of claim 1, wherein the end cap assembly further comprises an end cap arranged between the at least one piece of permanent magnet and the cover, the circuit board is supported by the end cap, and the motor further comprises a bearing fixed in the end cap.

5. The motor of claim 1, wherein the motor is a permanent magnet brush direct current motor.

6. The motor of claim 1, wherein the motor is a permanent magnet brushless direct current motor.

7. The motor of claim 1, wherein the motor further comprises a bearing fixed on an end of the shaft remote from the end cap assembly, and the bearing is electrically connected to a housing of the motor.

8. The motor of claim 1, wherein the motor further comprises a conductive connection member through which the cover is electrically connected to a stator housing, and the cover is grounded directly to the stator housing.

9. The motor of claim 8, wherein the conductive connection member is a wire.

* * * * *